United States Patent
Wang et al.

(10) Patent No.: US 12,191,613 B2
(45) Date of Patent: Jan. 7, 2025

(54) LOCATION-BASED WORKLOAD OPTIMIZATION

(71) Applicant: DELL PRODUCTS L.P., Round Rock, TX (US)

(72) Inventors: Isaac Q. Wang, Austin, TX (US); Jordan Chin, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 370 days.

(21) Appl. No.: 17/855,180

(22) Filed: Jun. 30, 2022

(65) Prior Publication Data
US 2024/0006827 A1    Jan. 4, 2024

(51) Int. Cl.
| | | |
|---|---|---|
| *H01R 24/50* | (2011.01) | |
| *H01R 12/71* | (2011.01) | |
| *H01R 12/72* | (2011.01) | |

(52) U.S. Cl.
CPC .......... *H01R 24/50* (2013.01); *H01R 12/712* (2013.01); *H01R 12/721* (2013.01)

(58) Field of Classification Search
CPC ..... H01R 24/50; H01R 12/712; H01R 12/721
USPC ...................................................... 439/387
See application file for complete search history.

(56) References Cited

U.S. PATENT DOCUMENTS

| | | | | |
|---|---|---|---|---|
| 6,261,104 B1 | * | 7/2001 | Leman ............... | H01R 12/721 |
| | | | | 439/752 |
| 6,533,587 B1 | * | 3/2003 | Potter ................ | H01L 23/467 |
| 2007/0212919 A1 | * | 9/2007 | Clayton ............. | H01R 12/721 |
| | | | | 257/E23.098 |
| 2015/0340817 A1 | * | 11/2015 | Li ....................... | H01R 13/6598 |
| | | | | 29/830 |
| 2017/0277230 A1 | * | 9/2017 | Samper .............. | H05K 7/1405 |
| 2021/0385971 A1 | * | 12/2021 | Gorius ............... | H05K 7/20281 |
| 2022/0050728 A1 | | 2/2022 | Foster, II et al. | |
| 2022/0091903 A1 | | 3/2022 | Bai et al. | |

FOREIGN PATENT DOCUMENTS

| | | | | |
|---|---|---|---|---|
| DE | 102020007986 A1 | * | 3/2021 | .......... G06F 11/3037 |
| WO | WO-2020234792 A1 | * | 11/2020 | .......... G06F 9/5027 |

* cited by examiner

*Primary Examiner* — Gary F Paumen
(74) *Attorney, Agent, or Firm* — Larson Newman, LLP

(57) ABSTRACT

An information handling system includes a plug-in connector interface and an accelerator module installed into the plug-in connector interface. The plug-in connector interface is located at a location on a printed circuit board of the information handling system. The information handling system instantiates a workload on a processor, and allocates a processing resource of the accelerator module to the workload based upon the plug-in connector interface being located at the location.

20 Claims, 6 Drawing Sheets

LOCATION-BASED WORKLOAD OPTIMIZATION

FIELD OF THE DISCLOSURE

This disclosure generally relates to information handling systems, and more particularly relates to providing location-based workload optimization in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a plug-in connector interface and an accelerator module installed into the plug-in connector interface. The plug-in connector interface may be located at a location on a printed circuit board of the information handling system. The information handling system may instantiate a workload, and may allocate a processing resource of the accelerator module to the workload based upon the plug-in connector interface being located at the location.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
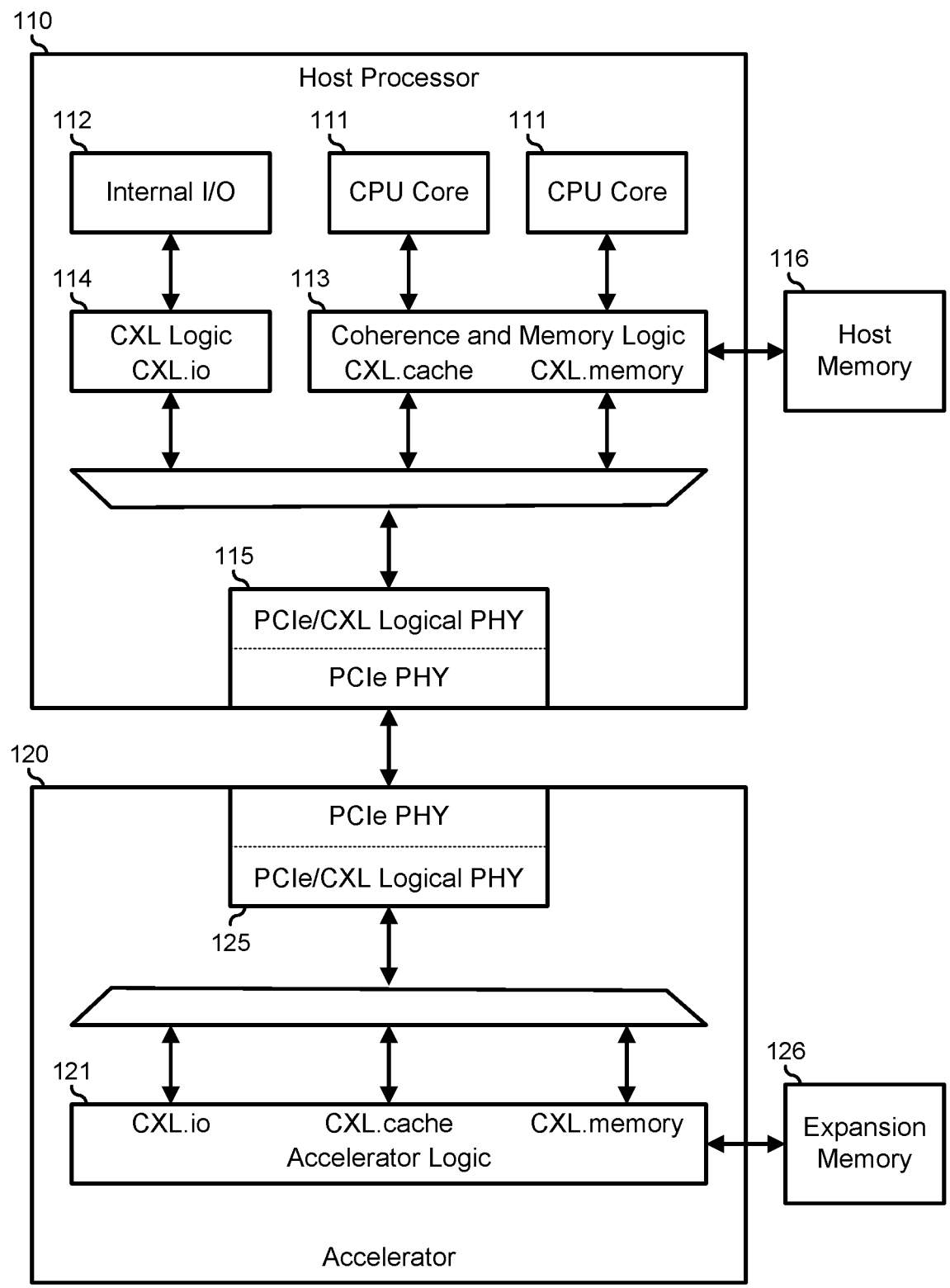
FIG. 1 is a block diagram of an Compute Express Link (CXL) information handling system according to an embodiment of the current disclosure.

FIG. 1 shows an information handling system 100 including a host processor 110 with associated host memory 116, and an accelerator device 120 with associated expansion memory 126. Host processor 110 includes one or more processor core 111, various internal input/output (I/O) devices 112, coherence and memory logic 113, Compute Express Link (CXL) logic 114, and a PCIe physical layer (PHY) interface 115. Coherence and memory logic 113 provides cache coherent access to host memory 116. The operation of a host processor, and particularly of the component functional blocks within a host processor, are known in the art, and will not be further described herein, except as needed to illustrate the current embodiments.

Accelerator device 120 includes accelerator logic 121, and a PCIe PHY interface 125 that is connected to PCIe PHY interface 115. Accelerator logic 121 provides access to expansion memory 126. Accelerator device 120 represents a hardware device configured to enhance the overall performance of information handling system 100. An examples of accelerator device 120 may include a smart Network Interface Card (NIC) or Host Bus Adapter (HBA), a Graphics Processing Unit (GPU), Field Programmable Gate Array (FPGA), or Application Specific Integrated Circuit (ASIC) device, a memory management and expansion device or the like, or another type of device configured to improve the performance of information handling system 100, as needed or desired. In particular, being coupled to host processor 110 via the PCIe link established between PCIe interfaces 115 and 125, accelerator device 120 may represent a task-based device that receives setup instructions from the host processor, and then independently executes the tasks specified by the setup instructions. In such cases, accelerator device 120 may access host memory 116 via a Direct Memory Access (DMA) device or DMA function instantiated on the host processor. When representing a memory management device, accelerator device 120 may represent a device configured to provide an expanded memory capacity, in the form of expansion memory 126, thereby increasing the overall storage capacity of information handling system 100, or may represent a memory capacity configured to increase the memory bandwidth of the information handling system, as needed or desired.

Information handling system 100 represents an information handling system configured in conformance with a Compute Express Link (CXL) standard, such as a CXL 1.1 specification, a CXL 2.0 specification, or any other CXL standard as may be published from time to time by the CXL Consortium. The CXL standard is an industry-supported interconnection standard that provides a cache-coherent interconnection between processors, accelerator devices, memory expansion devices, or other devices, as needed or desired. In this way, operations performed at diverse locations and by diverse architectures may maintain a memory coherency domain across the entire platform. The CXL standard provides for three (3) related protocols: CXL.io, CXL.cache, and CXL.memory. The CXL.io protocol represents an I/O protocol that is based upon the PCIe 5.0 protocol (for CXL specification 1.1) or the PCIe 6.0 protocol (for CXL specification 2.0).

For example, the CXL.io protocol provides for device discovery, configuration, and initialization, interrupt and DMA handling, and I/O virtualization functions, as needed or desired. The CXL.cache protocol provides for processors to maintain a cache-coherency domain with accelerator devices and their attached expansion memory, and with capacity- and bandwidth-based memory expansion devices, as needed or desired. The CXL.memory protocol permits processors and the like to access memory expansion devices in a cache-coherency domain utilizing load/store-based commands, as needed or desired. Further, the CXL.memory protocol permits the use of a wider array of memory types than may be supported by processor 110. For example, a processor may not provide native support for various types of non-volatile memory devices, such as Intel Optane Persistent Memory, but the targeted installation of an accelerator device that supports Intel Optane Persistent Memory may permit the information handling system to utilize such memory devices, as needed or desired.

In this regard, host processor 110 and accelerator device 120 each include logic and firmware configured to instantiate the CXL.io, CXL.cache, and CXL.memory protocols. In particular, within host processor 110, coherence and memory logic 113 instantiates the functions and features of the CXL.cache and CXL.memory protocols, and CXL logic 114 implements the functions and features of the CXL.io protocol. Further, PCIe PHY 115 instantiates a virtual CXL logical PHY. Likewise, within accelerator device 120, accelerator logic 121 instantiates the CXL.io, CXL.cache, and CXL.memory protocols, and PCIe PHY 125 instantiates a virtual CXL logical PHY. Within a CXL enabled accelerator device such as accelerator device 120, both the CXL.cache and CXL.memory protocols do not have to be instantiated, as needed or desired, but any CXL enabled accelerator device must instantiate the CXL.io protocol.

Figure 2:
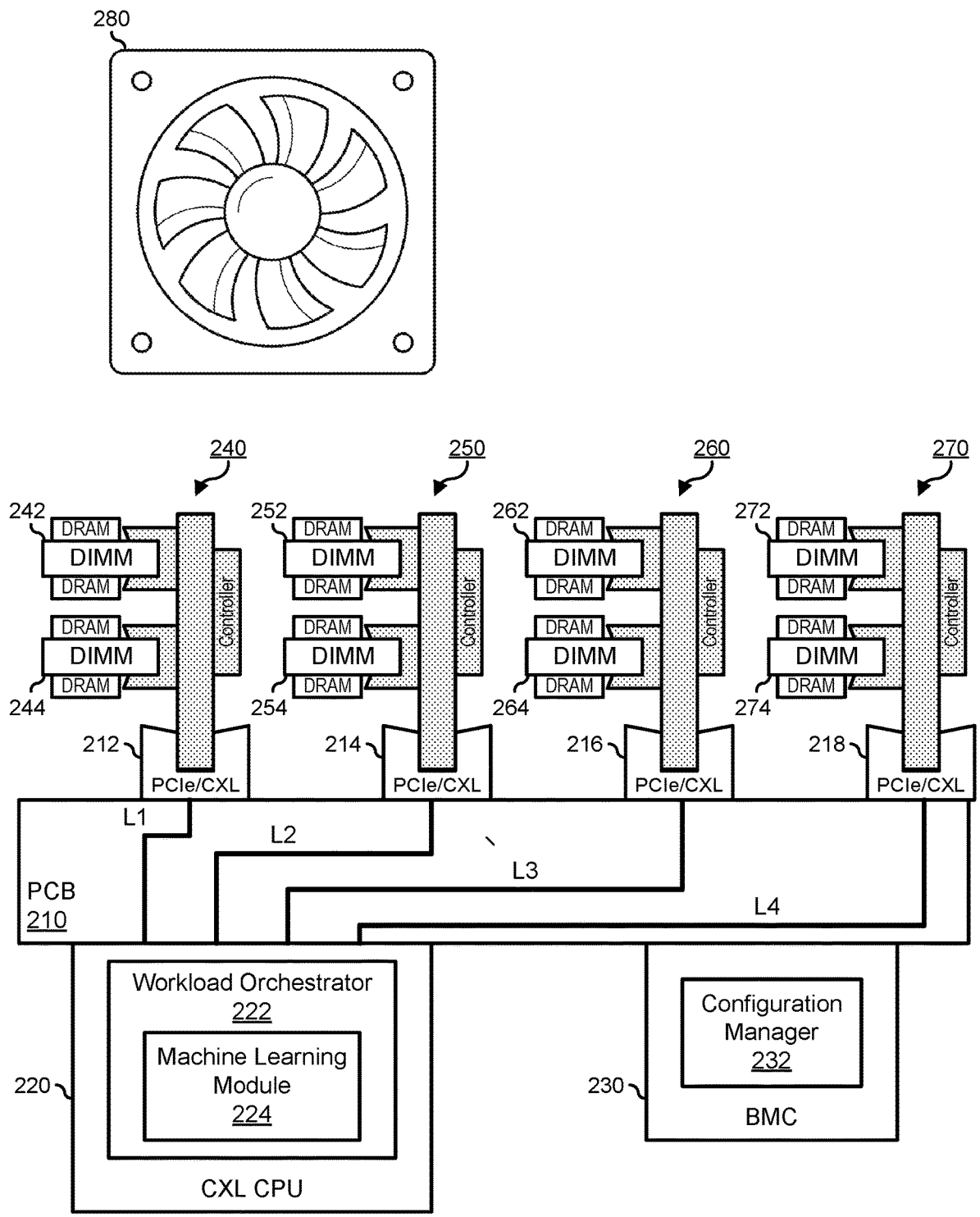
FIG. 2 is a block diagram of a CXL information handling system according to another embodiment of the current disclosure.

FIG. 2 illustrates an information handling system 200 similar to information handling system 100. Information handling system 200 includes a printed circuit board 210 populated with a CXL processor 220, a baseboard management controller (BMC) 230, and CXL/PCIe sockets 212, 214, 216, and 218. Socket 212 is populated with a memory riser card 240, socket 214 is populated with memory riser card 250, socket 216 is populated with a memory riser card 260, and socket 218 is populated with a memory riser card 270. Memory riser card 240 is populated with Dual In-Line Memory Modules (DIMMs) 242 and 244, memory riser card 250 is populated with DIMMs 252 and 254, memory riser card 260 is populated with DIMMs 262 and 264, and memory riser card 270 is populated with DIMMs 272 and 274. Information handling system 200 further includes a cooling fan 280 configured to provide an airflow of chilled air to at least a portion of the information handling system to cool the elements of the information handling system as needed or desired.

It has been understood by the inventors of the current disclosure that the physical and logical arrangements of CXL/PCIe slots 212, 214, 216, and 218 may impact the performance of the various workloads instantiated on CXL processor 220. For example, each one of CXL/PCIe slots 212, 214, 216, and 218 are physically located at unique locations on PCB 210, and each is associated with a corresponding trace length between the socket and CXL processor 220. Thus socket 212 is a first trace length distance (L1) from CXL processor 220, socket 214 is a second trace length distance (L2) from the processor, socket 216 is a third trace length distance (L3) from the processor, and socket 218 is a fourth trace length distance (L4) from the processor.

It has been further understood that, particularly for the high-speed interface signals, such as the sixteen (16) differential pair signal traces for a PCIe x16 interface socket, the trace length to each of sockets 212, 214, 216, and 218 introduces a unique signal delay between the socket and CXL processor. For example, the first trace length distance (L1) may introduce a 5 nanosecond (ns) signal delay, the second trace length distance (L2) may introduce a 10 ns signal delay, the third trace length distance (L3) may introduce a 15 nanosecond (ns) signal delay, and the fourth trace length distance (L4) may introduce a 20 ns signal delay. Here, it will be understood that the traces within PCB 210, as illustrated, are highly simplified, and that multiple individual signal, power, and return traces are represented by the single traces between sockets 212, 214, 216, and 218, and CXL processor 220. Thus the exemplary delays may be understood to represent an average of the delays of the individual high-speed interface signal, a longest delay of the high-speed interface signals, or the like. Here, the duration of the particular delays associated with the trace length distances L1, L2, L3, and L4 may impact the performance of the various workloads instantiated on CXL processor 220, based upon how the various workloads are allocated memory space among memory riser cards 240, 250, 260, and 270, and within respective DIMMs 242, 244, 252, 254, 262, 264, 272, and 274.

In another example where the physical and logical arrangements of CXL/PCIe slots 212, 214, 216, and 218 may impact the performance of the various workloads instantiated on CXL processor 220, the PCIe link width of the slots may vary, thus varying the transaction bandwidth between the processor and respective DIMMs 242, 244, 252, 254, 262, 264, 272, and 274. For example, CXL/PCIe slot 212 may represent a x16 PCIe interface, CXL/PCIe slot 214 may represent a x8 PCIe interface, CXL/PCIe slot 216 may represent a x4 PCIe interface, and CXL/PCIe slot 218 may represent a x2 PCIe interface.

In yet another example, where CXL processor 220 represents two or more processors or processor cores that each instantiate their own PCIe root complexes, it may be understood that a workload instantiated on a particular processor or processor core may achieve higher processing performance on that workload by allocating memory from a riser card that is connected to that processor or processor core's root complex. Moreover, where a memory allocation for a workload instantiated on a first processor or processor core is on a memory riser card connected to a root complex of a second processor or processor core, increased latency may result from the need to transit the inter-processor interface, and may incur further coherency latency to maintain the common coherence domain across the processors or processor cores.

In still another example, the cooling airflow provided by cooling fan 280 may not be evenly distributed across each of memory riser cards 240, 250, 260, and 270. Here, cooler memory riser cards may achieve higher performance levels than hotter memory riser cards, all other things being equal.

It has been further understood that the particular functions and features of memory riser cards 240, 250, 260, and 270 and respective DIMMs 242, 244, 252, 254, 262, 264, 272, and 274 may impact the performance of various workloads. In particular, memory riser cards 240, 250, 260, and 270 may each include a different memory controller device that introduces a different delay between receiving transaction requests and the execution of the transaction requests. In another case, the memory riser cards may each be populated with different types of DIMMs 242, 244, 252, 254, 262, 264, 272, and 274. For example, DIMMs 242 and 244 may represent fourth generation Double Data Rate (DDR4) DIMMs with a first bus speed, DIMMs 252 and 254 may represent DDR4 DIMMs with a different bus speed, DIMMS 262 and 264 may represent fifth generation DDR (DDR5) DIMMs, and DIMMs 272 and 274 may represent various types of non-volatile memory devices, such as NV-DIMMs (such as NVDIMM-F, NVDIMM-N, NVDIMM-P, etc.), Intel Optane Persistent Memory, or other types of non-volatile memory devices, as needed or desired. The amount of available memory storage space on one or more of DIMMs 242, 244, 252, 254, 262, 264, 272, or 274, or a utilization percentage of the DIMMs may permit for the allocation of one or more additional workloads as needed or desired.

In another example where the particular functions and features of memory riser cards 240, 250, 260, and 270 and respective DIMMs 242, 244, 252, 254, 262, 264, 272, and 274 may impact the performance of various workloads, information handling system 200 may implement a system power level budget, where the information handling system is limited to the use of a particular system power level threshold. When the power utilized by information handling system 200 exceeds the system power level threshold, the information handling system operates to lower (or shed) the power demand of the information handling system. The power shedding may be provided by reducing the number of workloads instantiated on CXL processor 220, by reducing an operating frequency of one or more components of the information handling system, by reducing an operating voltage of one or more components, or otherwise shedding the power demand of the information handling system. Further, memory riser cards 240, 250, 260, and 270 will be understood to have their own riser power level budgets. When a particular one of memory riser cards 240, 250, 260, or 270 are operating with a power demand that exceeds its riser power level budget, the particular riser card can operate to shed the power demand, for example, by reducing an operating frequency or otherwise throttling the operations of the particular riser card. Moreover, when a particular one of riser cards 240, 250, 260, or 270 is operating at a lower power level, and thus has a higher power margin, that particular riser card may be able to support additional workloads as needed or desired.

As illustrated, memory riser cards 240, 250, 260, and 270 each provide for an enhanced system memory space for information handling system 200, but this is not necessarily so. Memory riser cards 240, 250, 260, and 270 may represent other types of CXL add-in devices, such as accelerator devices as described above with regard to information handling system 100. For example, one or more of memory riser cards 240, 250, 260, and 270 may represent an accelerator device where the associated DIMMs represent expansion memory associated with the accelerator device, or one or more of the riser cards may represent a NIC or HBA where the associated DIMMs represent a Network Attached Storage (NAS), a Storage Area Network (SAN), or the like, as needed or desired. In any of the above cases, the physical, logical, or functional features of the associated devices may affect the performance of the workloads instantiated on CXL processor 220 and allocated to the respective devices.

BMC 230 includes a configuration manager 232 that operates to monitor, manage, and maintain the components of information handling system 200. In particular, configuration manager 232 is provided with information related to the physical and logical arrangements of the components of information handling system 200, including information related to the trace length distances L1, L2, L3, and L4 and the delay associated with the trace length distances, the PCIe slot widths of sockets 212, 214, 216, and 218, the root complex affinities of the sockets, the cooling airflow patterns and associated hot- and cool-spots within the information handling system, and other physical and logical arrangements within the information handling system, as needed or desired. Configuration manager 232 is further provided with information related to the functions and features of memory riser cards 240, 250, 260, and 270, and respective DIMMs 242, 244, 252, 254, 262, 264, 272, and 274, including the types of memory controllers, the types of DIMMs, the system and riser power budgets, and the like.

BMC 230 may have various communication channels, such as Inter-Integrated Circuit (I2C) interfaces, Network Controller Sideband Interface (NC-SI) interfaces, or the like, with which the BMC communicates with the components of information handling system 200 to monitor, manage, and maintain the components. As such, BMC 230 is in communication with CXL processor 220, which may instantiate a BMC agent to facilitate communications with the BMC. The utilization of a BMC in monitoring, managing, and maintaining the components of an information handling system, and the communications between a BMC and a processor are known in the art and will not be further described herein, except as may be needed to illustrate the current embodiments.

CXL processor 220 includes a workload orchestrator 222 configured to monitor, manage, and maintain workloads instantiated on the processor. As such, workload orchestrator 232 operates to inventory memory riser cards 240, 250, 260, and 270, and DIMMs 242, 244, 252, 254, 262, 264, 272, and 274, the physical and logical arrangements of the components of information handling system 200, and the functions and features of the components, as needed or desired. Workload orchestrator 222 further operates to determine the processing needs of the workloads instantiated on CXL processor 220, including any personality traits of the workloads, such as any affinities for memory storage capacity, memory bandwidth, and memory transaction latency, processing affinities for High-Performance Computing (HPC), machine learning, neural network processing, artificial intelligence processing, virtualization, or the like.

Utilizing the physical and logical arrangement information, the component function and feature information, the processing needs information, and the like, workload orchestrator 222 operates to optimize the placement of the workloads instantiated on CXL processor 222, and the allocation of resources to the instantiated workloads, including the allocation of memory riser cards 240, 250, 260, and 270, and DIMMs 242, 244, 252, 254, 262, 264, 272, and 274, to achieve a maximum level of processing performance within the constraints provided by information handling system 200. In particular, when a new workload is launched, workload orchestrator 222 operates to evaluate the needs of the new workload against the currently available resources to determine a set of potential resources to allocate to the new workload. For example, workload orchestrator 222 determines a particular processor or processor core upon which to instantiate the new workload, and, based upon the physical and logical arrangement information, the component function and feature information, the processing needs information, determines an optimized set of resources to allocate to the new workload.

The allocation of resources may further involve the migration of a workload from a first set of resources to a newly selected set of resources. For example, if a new workload is determined by workload orchestrator 222 to be more latency sensitive than an existing workload, and further if the existing workload is allocated to a set of low latency resources, the workload orchestrator can operate to migrate the existing workload to a new set of resources that have higher latency, and can then instantiate the new workload with the low-latency set of resources. Workload orchestrator 222 further operates to reclaim resources of information handling system 200 when a particular workload has finished processing.

In a particular embodiment, workload orchestrator 222 includes a machine learning module 224 configured to optimize the performance of the workloads instantiated on CXL processor 220. Machine learning module 224 may be pre-trained by a manufacturer of information handling system 200 to intelligently optimize the performance of the workloads that are most likely to be instantiated on CXL processor 220, as needed or desired. The pre-training may take into consideration the usages for which information handling system 200 is typically utilized. For example, where information handling system 200 represents a storage server, machine learning module 224 may be pre-trained to optimize various database or other storage applications as needed or desired.

On the other hand, where information handling system 200 represents a media server, machine learning module 224 may be pre-trained to optimize various streaming applications or the like. Then, during run time, at a user's site, such as at a data center, an edge processing node, or the like, machine learning module 224 operates to refine the learning model based upon the actual usage to which information handling system 200 is utilized, and the refinement of the learning model may occur faster than would be the case where machine learning module 224 is fully trained based exclusively upon run time usage. Examples of a machine learning model may include discriminative models such as linear regression models, boosting models, random forest models, and the like, or may include generative models such as Gaussian mixture models, Bayesian network models, latent Dirichlet allocation models, generative adversarial network models, or the like.

Figure 3:
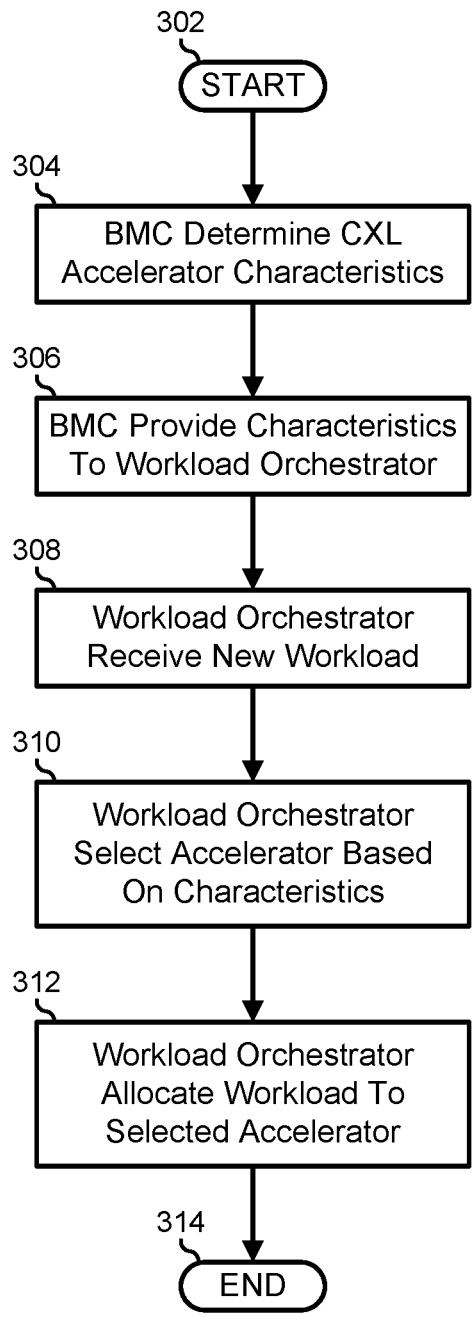
FIG. 3 is a flowchart illustrating a method for location-based workload optimization according to an embodiment of the current disclosure.

FIG. 3 illustrates a method 300 for location-based workload optimization starting at block 302. A BMC determines the characteristics of CXL accelerators installed into an information handling system in block 304. The BMC may determine the physical and logical characteristics of the information handling system and the CXL accelerators, and also the function and feature information as needed or desired. The BMC provides the characteristic information for the CXL accelerators to a workload orchestrator instantiated on the information handling system in block 306. The workload orchestrator receives a new workload to be instantiated on the information handling system in block 308, and, based upon the requirements of the new workload and the CXL accelerator characteristics, selects a particular set of CXL accelerators for the new workload in block 310. The workload orchestrator allocates the selected CXL accelerators to the new workload and launches the new workload in block 312, and the method ends in block 314.

Figure 4:
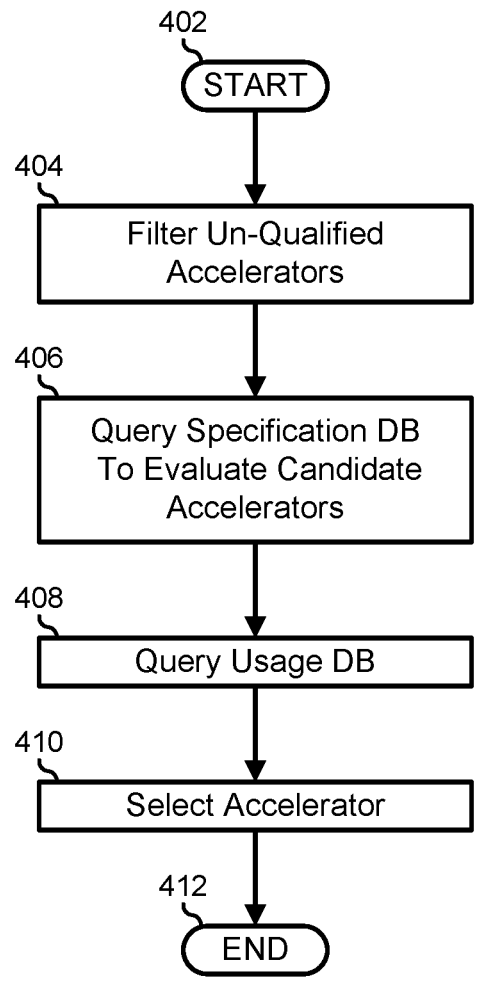
FIG. 4 is a flowchart illustrating a method for workload traffic balancing and assignment according to an embodiment of the current disclosure.

FIG. 4 illustrates a method 400 for workload traffic balancing and assignment starting at block 402. Here, method 400 may be understood to be applied with respect to block 310, as described above, including steps that may be performed in selecting a particular set of CXL accelerators for the new workload. A workload orchestrator, having received a workload to instantiate, filters a list of CXL accelerators based upon the processing needs of the workload, and rejects accelerators that do not meet the requirements in block 404. The workload orchestrator queries an accelerator specification database to evaluate suitable candidate CXL accelerators to determine a reduced list of candidate accelerators in block 406. The workload orchestrator queries a usage database to determine, from the list of candidate accelerators, a list of available accelerators in block 408, selects an accelerator upon which to instantiate the workload in block 410, and the method ends in block 412.

Figure 5:
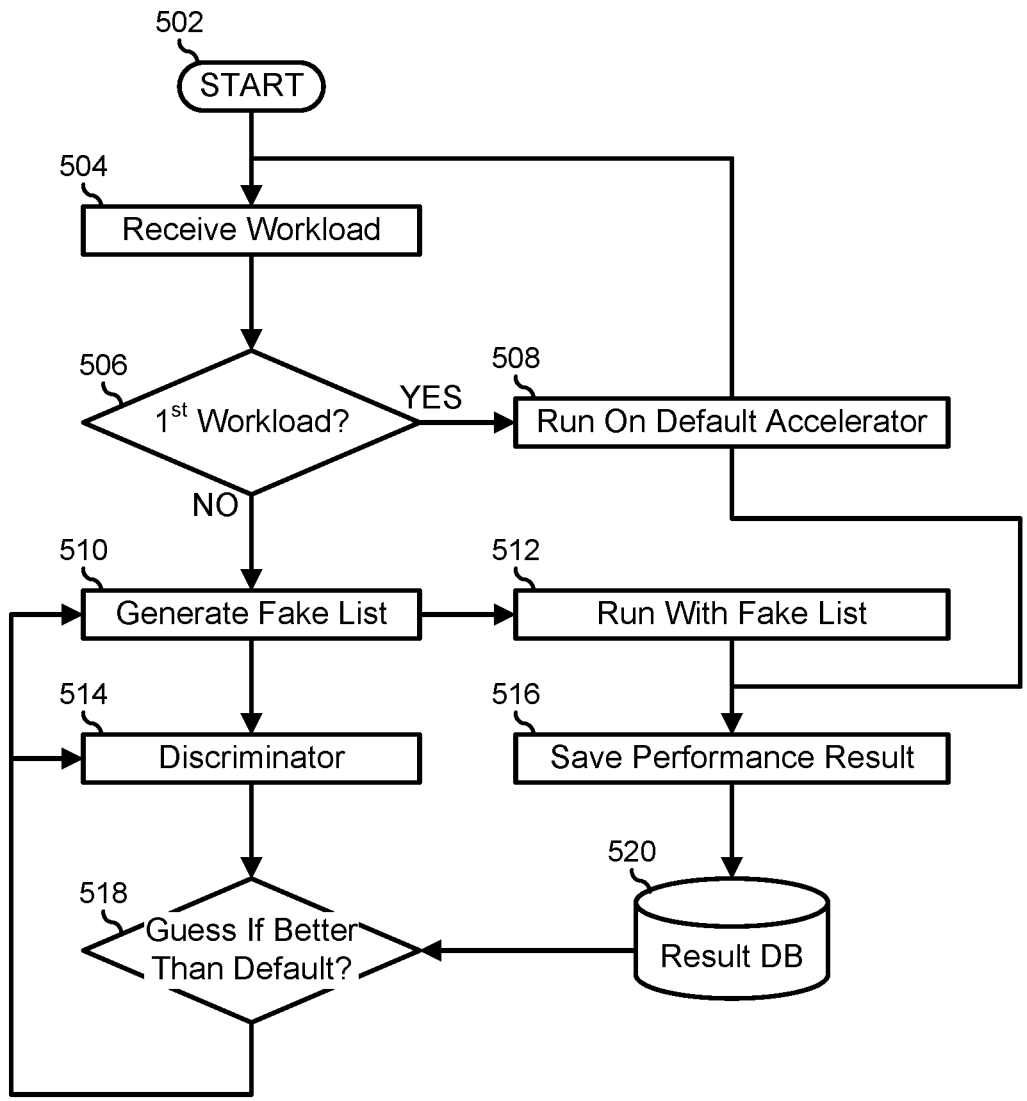
FIG. 5 is a flowchart illustrating a method for workload traffic balancing and assignment utilizing a Generative Adversarial Network (GAN) according to an embodiment of the current disclosure.

FIG. 5 illustrates a method 500 for workload traffic balancing and assignment utilizing a Generative Adversarial Network (GAN) starting at block 502. Method 500 may be utilized in association with an information handling system such as information handling system 200, or in association with a method for assigning workloads in an information handling system such as one of methods 300 and 400, as needed or desired. A workload is received by a GAN in block 504, and a decision is made as to whether or not the workload is a first workload received by the GAN in decision block 506. If so, the "YES" branch of decision block 506 is taken, the workload is run on a default accelerator in block 508, and the performance of the workload as run on the default accelerator is stored in block 516 to a performance database 520. If the workload is not the first workload received by the GAN, the "NO" branch of decision block 506 is taken and a generator of the GAN, that is, the neural network of the GAN that is being trained, generates a fake list of accelerators in block 510, the workload is run on the fake list accelerator in block 512, and the performance of the workload as run on the fake list accelerator is stored in block 516 to the performance database 520.

A discriminator of the GAN, that is, the adversarial neural network, attempts to classify the results as either real results or the fake results. The generator 510 and the discriminator 514 are trained together in a zero-sum game, until the Nash equilibrium is reached, that is, that the discriminator is fooled roughly half the time, as determined by decision block 518, meaning that the generator is generating plausible predictions of the best performance of the workload on the information handling system. Generator 510 may be trained in a training mode during the manufacturing process of the information handling system, and the generator may be refined by the real-time workloads at run time, as needed or desired.

Figure 6:
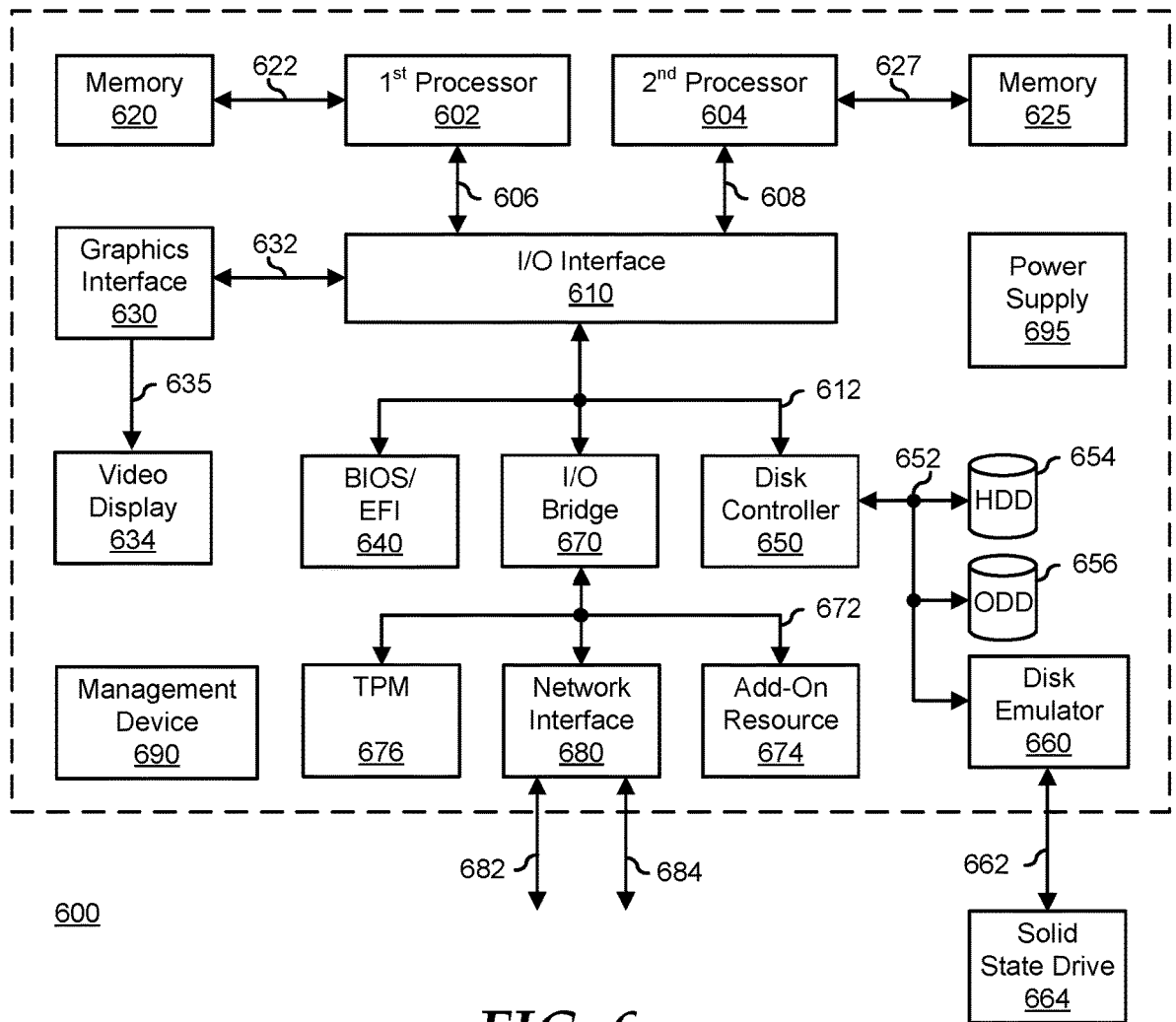
FIG. 6 is a block diagram illustrating a generalized information handling system according to another embodiment of the present disclosure.

FIG. 6 illustrates a generalized embodiment of an information handling system 600. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below, and operates to perform one or more of the methods described below. Information handling system 600 includes a processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656, a disk emulator 660 connected to an external solid state drive (SSD) 662, an I/O bridge 670, one or more add-on resources 674, a trusted platform module (TPM) 676, a network interface 680, a management device 690, and a power supply 695. Processors 602 and 604, I/O interface 610, memory 620 and 625, graphics interface 630, BIOS/UEFI module 640, disk controller 650, HDD 654, ODD 656, disk emulator 660, SSD 662, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632, and provides a video display output 635 to a video display 634. In a particular embodiment, information handling system 600 includes separate memories that are dedicated to each of processors 602 and 604 via separate memory interfaces. An example of memories 620 and 630 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an IEEE 1394 (Firewire) interface, a proprietary interface, or a combination thereof. Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612, or can be a different type of interface. As such, I/O bridge 670 extends the capacity of I/O channel 612 when peripheral interface 672 and the I/O channel are of the same type, and the I/O bridge translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600. Management device 690 can operate off of a separate power plane from the components of the host environment so that the management device receives power to manage information handling system 600 when the information handling system is otherwise shut down. An example of management device 690 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 690 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
    a processor:
    a first plug-in connector interface located at a first location on a printed circuit board of the information handling system; and
    a first accelerator module installed into the first plug-in connector interface;
    wherein the information handling system is configured to instantiate a first workload on the processor, and to allocate a first processing resource of the first accelerator module to the first workload based upon the first plug-in connector interface being located at the first location.

2. The information handling system of claim 1, further comprising:
    a second plug-in connector interface coupled to the processor, the second plug-in connector interface being located at a second location on the printed circuit board; and
    a second accelerator module installed into the second plug-in connector interface;
    wherein the information handling system is further configured to instantiate a second workload on the processor, and to allocate a second processing resource of the second accelerator module to the second workload based upon the second plug-in connector interface being located at the second location.

3. The information handling system of claim 2, wherein the first location is a first trace length distance from the processor and the second location is a second trace length distance from the processor, the first trace length distance being different from the second trace length distance.

4. The information handling system of claim 3, wherein the first trace length distance is a shorter trace length distance than the second trace length distance.

5. The information handling system of claim 4, wherein a first transaction between the processor and the first accelerator module has a shorter latency than a second transaction between the processor and the second accelerator module based upon the first trace length distance being shorter than the second trace length distance.

6. The information handling system of claim 5, wherein the information handling system is further configured to determine that the first workload is more sensitive to latency than the second workload.

7. The information handling system of claim 6, wherein the information handling system is further configured to allocate the first processing resource to the first workload and to allocate the second processing resource to the second workload based upon the determination that the first workload is more sensitive to latency than the second workload.

8. The information handling system of claim 2, wherein the first location is cooler than the second location.

9. The information handling system of claim 2, further comprising a baseboard management controller configured to determine that the first plug-in connector interface is located at the first location and that the second plug-in connector interface is located at the second location.

10. The information handling system of claim 1, wherein the first accelerator module is a memory riser module.

11. A method, comprising:
    coupling a processor of an information handling system to a first plug-in connector interface, the first plug-in connector interface being located at a first location on a printed circuit board of the information handling system;

installing a first accelerator module into the first plug-in connector interface;

instantiating a first workload on the processor; and allocating a first processing resource of the first accelerator module to the first workload based upon the first plug-in connector interface being located at the first location.

12. The method of claim 11, further comprising:

coupling the processor to a second plug-in connector interface, the second plug-in connector interface being located at a second location on the printed circuit board;

installing a second accelerator module into the second plug-in connector interface;

instantiating a second workload on the processor; and allocating a second processing resource of the second accelerator module to the second workload based upon the second plug-in connector interface being located at the second location.

13. The method of claim 12, wherein the first location is a first trace length distance from the processor and the second location is a second trace length distance from the processor, the first trace length distance being different from the second trace length distance.

14. The method of claim 13, wherein the first trace length distance is a shorter trace length distance than the second trace length distance.

15. The method of claim 14, wherein a first transaction between the processor and the first accelerator module has a shorter latency than a second transaction between the processor and the second accelerator module based upon the first trace length distance being shorter than the second trace length distance.

16. The method of claim 15, further comprising determining that the first workload is more sensitive to latency than the second workload.

17. The method of claim 16, further comprising allocating the first processing resource to the first workload and allocating the second processing resource to the second workload based upon the determination that the first workload is more sensitive to latency than the second workload.

18. The method of claim 12, wherein the first location is cooler than the second location.

19. The method of claim 12, further comprising determining, by a baseboard management controller, that the first plug-in connector interface is located at the first location and that the second plug-in connector interface is located at the second location.

20. An information handling system, comprising:

a first plug-in connector interface located at a first location on a printed circuit board of the information handling system;

a first memory riser module installed into the first plug-in connector interface;

a second plug-in connector interface located at a second location on the printed circuit board; and a second memory riser module installed into the second plug-in connector interface;

wherein the information handling system is configured to instantiate a first workload on a processor, to allocate a first processing resource of the first memory riser module to the first workload based upon the first plug-in connector interface being located at the first location, to instantiate a second workload on the processor, and to allocate a second processing resource of the second memory riser module to the second workload based upon the second plug-in connector interface being located at the second location.

* * * * *